(12) United States Patent
Axmon et al.

(10) Patent No.: US 12,342,316 B2
(45) Date of Patent: *Jun. 24, 2025

(54) COMMUNICATION NODES AND METHODS FOR RELATIVE POSITIONING OF WIRELESS COMMUNICATION DEVICES

(71) Applicant: Telefonaktiebolaget LM Ericsson (publ), Stockholm (SE)

(72) Inventors: Joakim Axmon, Limhamn (SE); Arthur T. G. Fuller, Kanata (CA); Esther Sienkiewicz, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,575

(22) Filed: Jun. 21, 2022

(65) Prior Publication Data

US 2023/0397153 A1    Dec. 7, 2023

Related U.S. Application Data

(63) Continuation of application No. 16/472,056, filed as application No. PCT/EP2016/082615 on Dec. 23, 2016, now Pat. No. 11,395,253.

(51) Int. Cl.
*H04W 64/00*    (2009.01)
*G05D 1/00*    (2006.01)
(Continued)

(52) U.S. Cl.
CPC ............ *H04W 64/006* (2013.01); *G05D 1/12* (2013.01); *H04W 4/023* (2013.01); *H04W 4/029* (2018.02);
(Continued)

(58) Field of Classification Search
CPC ... H04W 64/006; H04W 4/023; H04W 4/029; G05D 1/12; B64C 39/024; B64U 10/13; B64U 2101/60; B64U 2201/00
See application file for complete search history.

(56) References Cited

U.S. PATENT DOCUMENTS

2006/0227047 A1* 10/2006 Rosenberg ............ G01S 5/0054
342/357.55
2009/0070026 A1* 3/2009 Kubota .................. G08G 1/161
701/117
(Continued)

FOREIGN PATENT DOCUMENTS

KR    101452343 B1    10/2014
WO    2016022646 A1    2/2016
(Continued)

OTHER PUBLICATIONS

"LTE; Evolved Universal Terrestrial Radio Access (E-UTRA); LTE Positioning Protocol (LPP) (3GPP TS 36.355 version 9.14.0 Release 9)", ETSI TS 136 355 V9.14.0, Jul. 2014, pp. 1-120.

*Primary Examiner* — Anne Marie Antonucci
*Assistant Examiner* — Connor L Knight
(74) *Attorney, Agent, or Firm* — Murphy, Bilak & Homiller, PLLC (57) ABSTRACT

A server node and method therein for assisting a first wireless communication device and a second wireless communication device to seek each other in a wireless communication network are disclosed. The server node inquires positioning and movement information of the first and second devices and obtains information on a relative position between the first and the second devices. The server node then sends instructions to at least one of the first and second devices based on the information on the relative position.

20 Claims, 9 Drawing Sheets

(51) Int. Cl.
*G05D 1/12* (2006.01)
*H04W 4/02* (2018.01)
*H04W 4/029* (2018.01)
*B64U 10/13* (2023.01)
*B64U 101/64* (2023.01)

(52) U.S. Cl.
CPC .......... *B64U 10/13* (2023.01); *B64U 2101/64* (2023.01); *B64U 2201/00* (2023.01); *B64U 2201/20* (2023.01)

(56) References Cited

U.S. PATENT DOCUMENTS

| | | | | |
|---|---|---|---|---|
| 2009/0081958 | A1* | 3/2009 | McNew | G08G 1/163 455/67.11 |
| 2009/0221298 | A1* | 9/2009 | Hanner | G01S 3/78 455/456.1 |
| 2014/0180574 | A1 | 6/2014 | Lee et al. | |
| 2014/0316243 | A1 | 10/2014 | Niedermeyer | |
| 2014/0343845 | A1 | 11/2014 | Choi et al. | |
| 2015/0302350 | A1 | 10/2015 | Stuckman et al. | |
| 2015/0358777 | A1 | 12/2015 | Gupta | |
| 2015/0370251 | A1* | 12/2015 | Siegel | G05D 1/0684 701/2 |
| 2016/0033966 | A1 | 2/2016 | Farris et al. | |
| 2016/0100290 | A1 | 4/2016 | Smith | |
| 2016/0351054 | A1* | 12/2016 | Zhang | H04W 52/0225 |
| 2016/0381509 | A1* | 12/2016 | Edge | H04W 4/029 455/456.1 |
| 2018/0164106 | A1* | 6/2018 | Peterson | G01C 21/3617 |
| 2022/0360955 | A1* | 11/2022 | Kime | H04W 12/02 |

FOREIGN PATENT DOCUMENTS

| | | | | |
|---|---|---|---|---|
| WO | WO-2016058648 | A1 * | 4/2016 | ............ H04W 4/028 |
| WO | WO-2016189112 | A1 * | 12/2016 | .......... B60W 30/095 |

* cited by examiner

COMMUNICATION NODES AND METHODS FOR RELATIVE POSITIONING OF WIRELESS COMMUNICATION DEVICES

TECHNICAL FIELD

Embodiments herein relate to communication nodes and methods therein for relative positioning of wireless communication devices. In particular, they relate to assisting a first wireless communication device and a second wireless communication device to seek and locate each other in a wireless communication network.

BACKGROUND

Wireless communication networks, such as Global System for Mobile Communications (GSM) networks, Wideband Code Division Multiple Access (WCDMA) or High Speed Packet Access (HSPA) networks, 3G Long Term Evolution (LTE) networks, usually cover a geographical area which is divided into cell areas. Each cell area is served by a base station, which may also be referred to as a network node, eNodeB (eNB), an access node etc. A wireless communication network may include a number of cells that can support communications for a number of wireless communication devices or user equipment (UEs).

Internet of Things (IoT) is a network of physical objects or devices, buildings, sensors, computers and other items connected through software and/or wireless communication networks. The recent drive to connect anything that can be connected has led to an explosion of sensors and drone technology connected by various means.

Drones, also known as unmanned aerial aircraft or aerial unmanned vehicle, are used today for delivery of packages purchased online. The current technology allows for the user to program the drone with a GPS or address location as the end destination, at which point there is no modification or communication with the drone to alter the location after the drone has been launched.

Sensors as they have been described are being used biologically, as wearable devices, and in other applications such as water quality monitoring. These sensors are generally made to be low cost and used to help collect massive amounts of data. After their usefulness the purpose is to dispose of them. However, with hundreds if not thousands of these out in the world it may not be obvious how they can be collected after such data has been collected.

Positioning services for UEs have attracted a lot of interest for several years. In some use cases the positioning is typically triggered by an application in the UE in order to tailor a service, such as web content, specific to the current location. In other use cases it is instead triggered by the network or an application/client attached to the network, for example when locating a device in an emergency situation. A coarse positioning method that was used in early stages is to determine what Cell-ID the UE is connected to or camping on, and deduce a coarse position estimate as the coverage area of that cell, and/or the area in which this cell provides the highest received signal level.

Other early methods were more UE based without any required involvement by the cellular network. One such method for UEs, for example smartphones, that support communications over short-range technologies such as Wireless Local Area Network (WLAN) can be based on a proximity to an access point with a known position. In addition, most smartphones also include a GPS receiver that often can provide an accurate position.

In LTE Release 9, a more advanced network based positioning framework was introduced. A new network node or a positioning node, the Evolved Serving Mobile Location Centre (E-SMLC) was introduced for management of the positioning services in the network. An LTE Positioning Protocol (LPP) for specifying position related signaling within nodes is also introduced in the network. The position estimate can be calculated in in the network node, referred as E-SMLC-based or NW-based, and may use information provided by the UE and/or eNB(s).

In LTE, a positioning procedure for a UE may be initiated either by the UE itself through Mobile Originated Location Request (MO-LR), or by the network through Network Induced Location Request (NI-LR) or by an external client e.g. a server in the cloud through Mobile Terminated Location request (MT-LR). Two interfaces between the UE and E-SMLC exist: control plane and Secure User Plane Location (SUPL).

The positioning methods may be based on Observed Time Difference of Arrival (OTDOA) or Assisted Global Navigation Satellite System (A-GNSS). The OTDOA method involves measurements on Positioning Reference Signals (PRS) transmitted by eNBs, in which the UE utilizes the PRS to measure the Reference Signal Time Difference (RSTD) between subframes transmitted from neighbor cells and a reference cell. The UE reports the measured time differences over the LPP protocol to the E-SMLC, which then uses the measurements to calculate the UE position.

Delivering packages by use of drone technology is a problem that has been addressed using various techniques. In US20160033966, a method is described in which the package receiver makes use of a homing device that directly communicates with the drone in order to guide it to its destination. Similarly, in US20140316243, a method is described where the drone and package receiver directly communicate with each other. This requirement for a specialized homing device or dedicated communication equipment adds additional cost to the delivery process and precludes the practical application of this technique to general "every-day" delivery scenarios.

In US20150370251, a method is described for drone deliveries to a vehicle moving along a route. This method involves a server entity which receives absolute position, e.g. GPS, information from both drone and vehicle and selects a "pickup location" for the package to be delivered to. This method is limited by the requirement that both the drone and the package receiver must have direct knowledge of their own absolute position e.g. GPS coordinates. Moreover, it does not directly send the drone to the package receiver, but to a location that both will eventually reach.

In US20150302350, a method is described where a "delivery data server application" receives a delivery address from the package receiver and then directs a delivery to the specified delivery address. This approach has limited applicability to drone deliveries because if the end destination changes e.g. the package receiver is moving or the drone needs to be redirected, then this may not be possible.

Additionally, as more of these low cost sensors are placed throughout the world to collect big amounts of data, not much thought has been given to how to collect all these sensors back once the need no longer exists. In US 20150358777, a method is described where an IoT device generates a "location profile" after receiving a request for its position from an external device. This is accomplished by obtaining "augmented location information" from other nearby IoT devices and their surrounding environment. This method is limited in that it requires additional IoT devices to determine the necessary position information. Moreover, it does not address the scenario where the IoT device is moving e.g. floating water quality sensor.

SUMMARY

It is therefore an object of embodiments herein to provide an improved method and apparatus for network-assisted positioning of wireless communication devices such that two or more devices can meet each other in a wireless communication network.

According to a first aspect of embodiments herein, the object is achieved by a method performed in a server node for assisting a first wireless communication device and a second wireless communication device to seek each other in a wireless communication network. The server node inquires positioning and movement information of the first and second devices. The server node obtains information on a relative position between the first and the second devices. The server node further sends instructions to at least one of the first and second devices based on the information on the relative position.

According to a second aspect of embodiments herein, the object is achieved by a method performed in a network node for relative positioning for a first wireless communication device and a second wireless communication device in a wireless communication network. The first and second devices wish to seek each other. The network node receives a request on positioning estimates of the first and second wireless communication devices from a server. The network node then inquires positioning and movement information of the first and second devices. The network node determines a relative positioning between the first and second wireless communication devices and provides information on the relative positioning between the first and second wireless communication devices to the server.

According to a third aspect of embodiments herein, the object is achieved by a server node for assisting a first wireless communication device and a second wireless communication device to seek each other in a wireless communication network. The server node is configured to inquire positioning and movement information of the first and second devices and obtain information on a relative position between the first and the second devices. The server node is further configured to send instructions to at least one of the first and second devices based on the information on the relative position.

According to a fourth aspect of embodiments herein, the object is achieved by a network node for relative positioning for a first wireless communication device and a second wireless communication device in a wireless communication network. The first and second devices wish to seek each other. The network node is configured to receive a request on positioning estimates of the first and second wireless communication devices from a server. The network node is further configured to inquire positioning and movement information of the first and second devices. The network node is configured to determine a relative positioning between the first and second wireless communication devices and provide information on the relative positioning between the first and second wireless communication devices to the server.

The embodiments herein provide means for bringing at least two devices together, e.g. a UE and a drone, via network-assisted relative positioning. The network-assisted relative positioning may be based on Network Induced Location Request (NI-LR) or Mobile Terminated Location Request (MT-LR) depending on whether the node determining the relative positioning is comprised in the core network, i.e. operator's network or in the cloud, i.e. a third party internet server or a LBS server.

The information on relative position may be any one of or a combination of a proximity indication, predicted paths or movement pattern(s) of the second device, a probability of the second device taking each of predicted paths etc. With the instruction based on the relative position information, the two devices are able to find each other or meet together. The relative positioning may utilize some existing positioning systems available today. Although some solutions may already exist today with a GPS to direct drones to a previously programmed location, the embodiments herein provide an additional granularity e.g. within 50 m of target location. In addition, for situations when there is no GPS signal available or when an IoT device has no GPS capability due to restriction on cost, power and size, it can still use relative positioning functionality. The embodiments herein provide a finer search by using relative positioning and can even be used if both devices are mobile. The embodiments herein also allow for the UE or the drone to change final destination location and therefore it is not restricted to the end location initially programmed to the drone.

Therefore the embodiments herein provide an improved method and apparatus for network-assisted positioning of wireless communication devices by obtaining the relative positioning information and providing up to date and dynamic instruction and information to at least one of the first and second devices so that they can find and meet each other.

BRIEF DESCRIPTION OF THE DRAWINGS

Examples of embodiments herein are described in more detail with reference to attached drawings in which.

DETAILED DESCRIPTION

Figure 1:
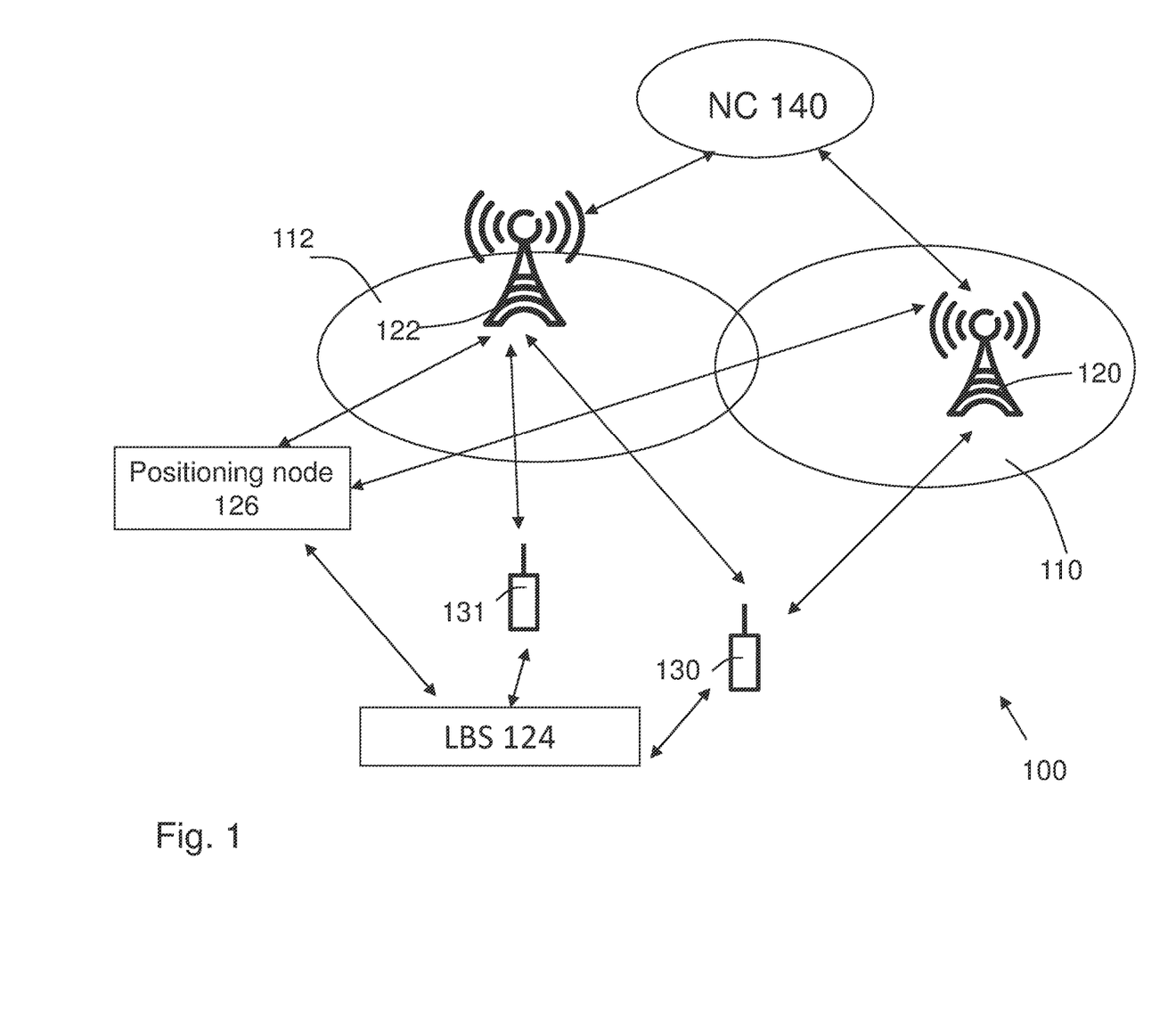
FIG. 1 is a schematic block diagram illustrating embodiments of a wireless communication network.

FIG. 1 depicts an example of a wireless communication network 100 in which embodiments herein may be implemented. The wireless communication network 100 may be any wireless system or cellular network, such as a Long Term Evolution (LTE) network, any 3$^{rd}$ Generation Partnership Project (3GPP) cellular network, Worldwide interoperability for Microwave Access (Wimax) network, Wireless Local Area Network (WLAN/Wi-Fi), a Fourth Generation (4G) network, a Fifth Generation (5G) cellular network etc.

The wireless communication network 100 comprises a plurality of cells whereof two, a first cell 110 comprising a first Access Node (AN) 120 and a second cell 112 comprising a second Access Node 122, are depicted in FIG. 1. The first Access Node 120 serves the first cell 110, while the second Access Node 122 serves the second cell 112. The first Access Node 120, the second Access Node 122 are network access nodes which each may be, for example, an eNB, gNB, eNodeB, gNodeB or a Home Node-B, Home eNode-B, Home gNode-B. The wireless communication network 100 may further comprise other network nodes capable to serve a wireless communication device in a wireless communication network, whereof an internet server node, e.g. Location Based Service server or client LBS 124 and a positioning node 126, e.g. E-SMLC, are depicted in FIG. 1. The positioning node 126 may determine and possible maintain position information for the wireless communication devices.

The wireless communication network 100 may further comprise a Network Controller 140 which communicates with the first and second access nodes 120, 122, and acts as a handling unit or a controller for different Radio Access Technologies. The Network Controller 140 may be a separate node as depicted in the figure, or its corresponding functionalities may be incorporated within another network node such as e.g. the Access nodes 120, 122.

A plurality of wireless communication devices operates in the wireless communication network 100, whereof two wireless communication devices 130, 131 are depicted. The wireless communication devices 130, 131 may be any IoT devices, such as a drone, a user equipment, a mobile wireless terminal or a wireless terminal, a mobile phone, a sensor or actuator with wireless capabilities or any other radio network units capable to communicate over a radio link in a wireless communication network. As shown in FIG. 1, the wireless communication devices 130, 131 may communicate with the first, second Access Nodes 120, 122 or with the positioning node 126, the LBS 124 via network nodes.

Figure 2:
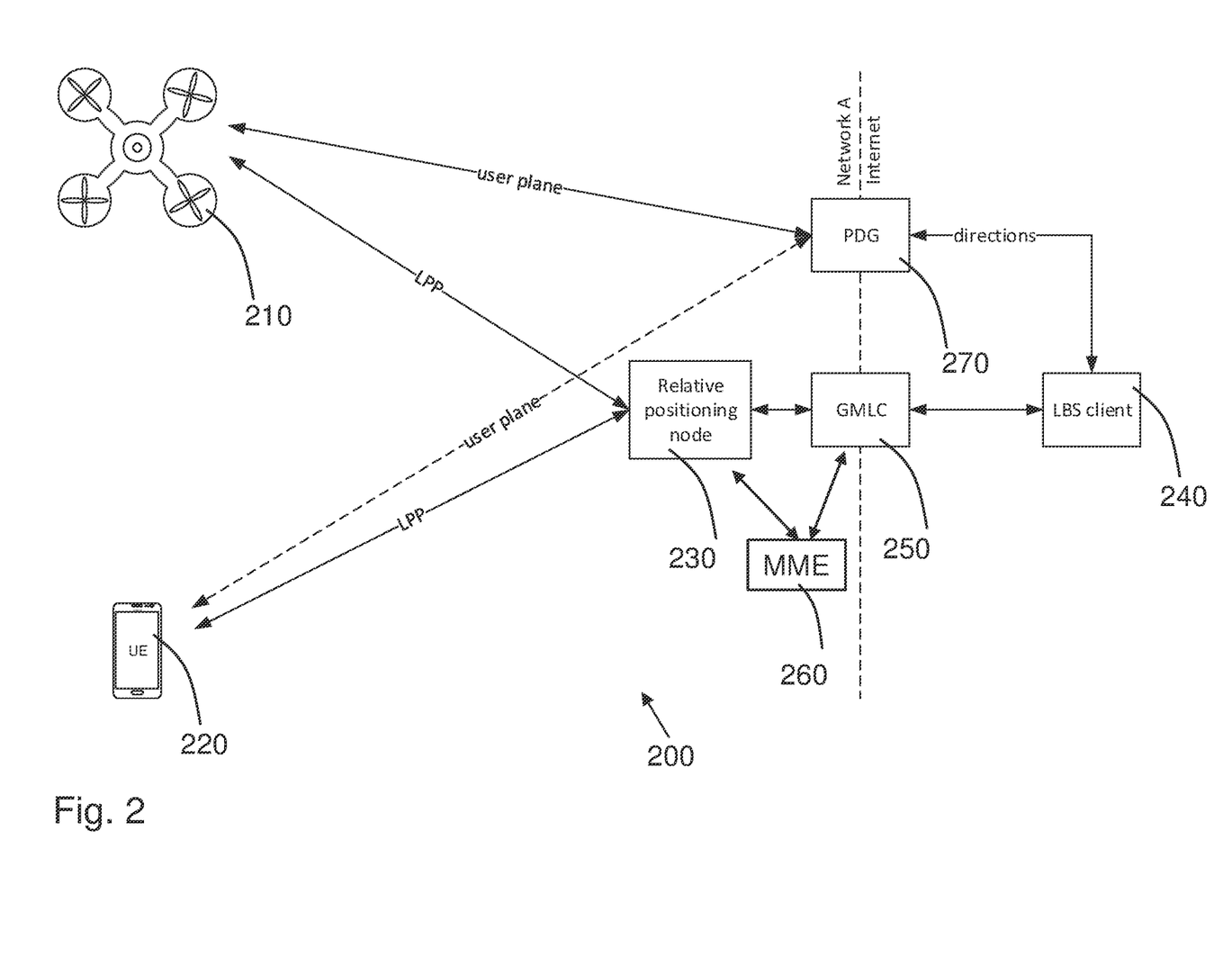
FIG. 2 is a schematic block diagram illustrating one example embodiment of NI-LR-based relative positioning solution for two or more wireless communication devices in a wireless communication network.

FIG. 2 illustrates one example embodiment of NI-LR-based relative positioning solution for two or more wireless communication devices in a wireless communication network 200, wherein a first wireless communication device is shown by a drone 210, a second wireless communication device is shown by an UE 220.

The wireless communication network 200 comprises a relative positioning node 230, e.g. E-SMLC 230, that allows relative positioning between at least the two wireless communication devices over the LPP protocol either via the control plane or the SUPL. The wireless communication network 200 may communicate with other nodes outside the core network, e.g. a third party internet server, whereof a server or client node 240, e.g. a LBS 240 is shown. The LBS 240 is a client with respect to the relative positioning node 230 and is a server with respect to the drone 210.

The procedure for an externally triggered positioning over the control plane is as following. The LBS 240 sends a request to request location of a particular UE via a Gateway Mobile Location Center GMLC 250 in the wireless communication network. The GMLC 250 forwards the request to a Mobility Management Entity MME 260 to which the UE 220 is associated. The MME 260 requests the location of the UE 220 from the E-SMLC 230, which depending on positioning method starts a procedure that involves eNodeB only or both eNodeB and the UE. The positioning methods may be any available methods such as Wi-Fi-based position, Observed Time Difference of Arrival (OTDOA), Enhanced Cell ID (E-CID), and A-GNSS etc.

Before the E-SMLC 230 determines which positioning method to use it requests the UE to provide its capabilities, i.e., which methods it supports. After having selected a method, the E-SMLC provides assistance data to the UE, and then requests the UE to determine information about its location. In case of OTDOA, it is provided as the relative timing of reference signals received from different cells, e.g. cell 110, 112, whereas if it is A-GNSS it is an absolute position provided e.g. by GPS or GLONASS.

The same procedure may apply to the drone 210 to determine its position. Then the node 230 determines a relative position between the drone 210 and the UE 220, and provides updates of relative position(s) to the LBS 240 which sends directions to the drone 210, and potentially to the UE 220 over the user plane via the Packet Data Network Gateway PDG 270.

The relative positioning node 230 further may provide an indication of a proximity, and one or more predicted paths and the probability of the tracked device, e.g. the UE 220, taking each of the paths. In this embodiment, the relative positioning node 230 is comprised in the E-SMLC node. However the relative positioning node 230 may be comprised e.g. in the MME, SLP (SUPL Location Platform) or may be a separate node.

Figure 3:
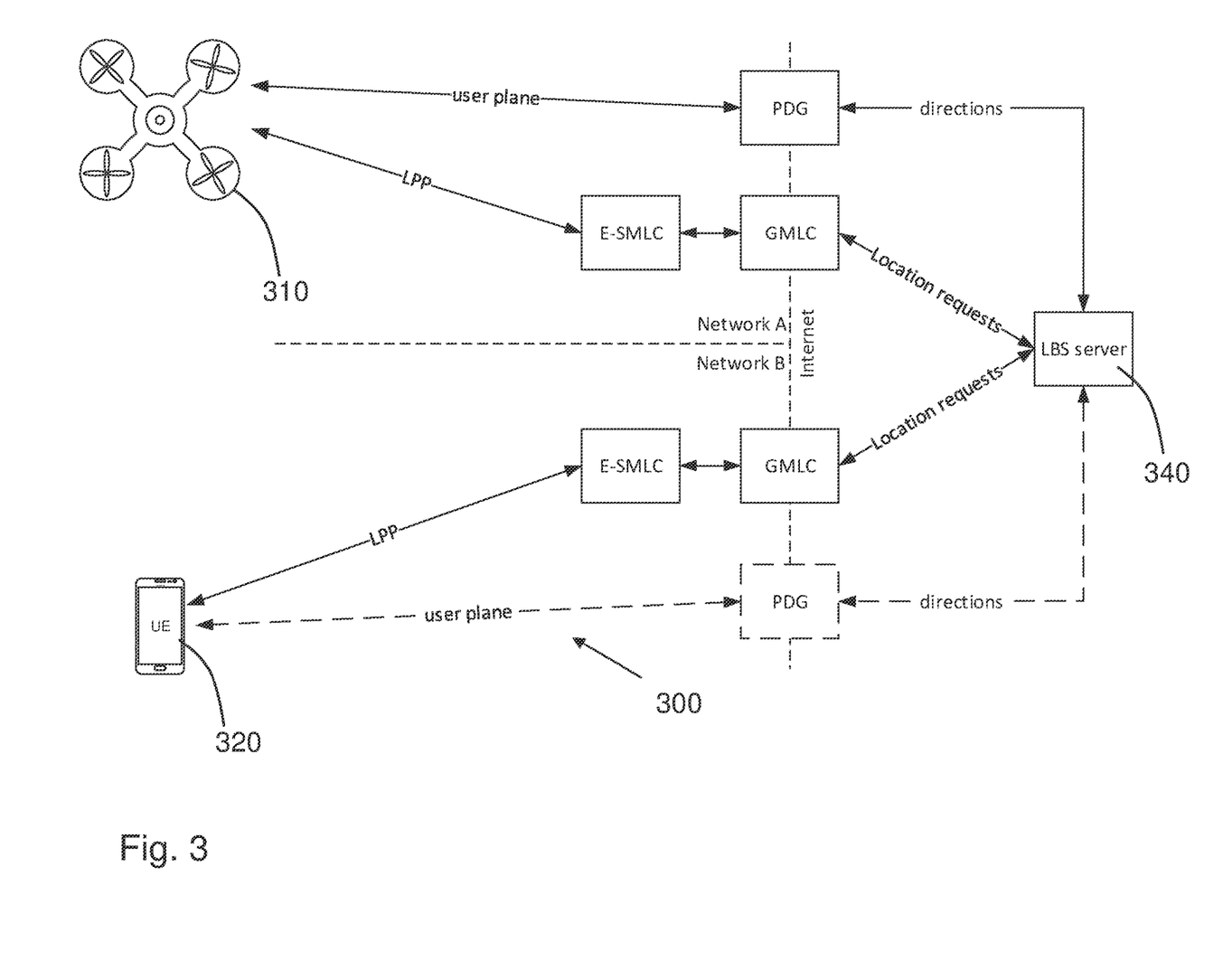
FIG. 3 is a schematic block diagram illustrating one example embodiment of MT-LR-based relative positioning solution for two or more wireless communication devices in a wireless communication network.

FIG. 3 Illustrates one example embodiment of a MT-LR-based relative positioning solution for two or more wireless communication devices in a wireless communication network 300, wherein a first wireless communication device is shown by a drone 310, a second wireless communication device is shown by an UE 320. In this embodiment, the relative positioning is handled outside the core network by a third party internet server, e.g. a LBS server 340. The third party server 340 uses MT-LR to acquire positioning and movement information for the drone 310 and the tracked device UE 320, each within Network A and Network B, respectively, where Network A may be the same as Network B.

The third party internet server 340 may be the LBS server for the drone 310 or another internet server. If it is another internet server than the LBS server for the drone 310, it will provide the relative position information to the drone server which will send instructions or directions to the drone 310, and potentially to the UE 320 over the user plane.

The relative positioning solutions described above may be used generally for applications where two wireless communication devices wishing to find or meet each other, e.g. a drone to deliver a package to a customer in a drone delivery system. Currently. and in a general sense, the drone delivery system is envisioned as having a customer orders an available product, designates the destination location, selects the time frame and pays for the product. The order is received and put in the queue, item is picked, packed, and secured to the drone. The flight plan is loaded. The drone flies between 400 and 1,000 feet at 100 mph or less using flight corridors, i.e. three-dimensional aerial freeways, as required. Nearing the destination, the drone exits the corridor and flies to the GPS location at approximately a 400 foot altitude. The drone with package descends like an elevator and the package is released on or near the ground. So the absolute GPS position is used and the destination location is fixed in this general drone delivery system.

Figure 4:
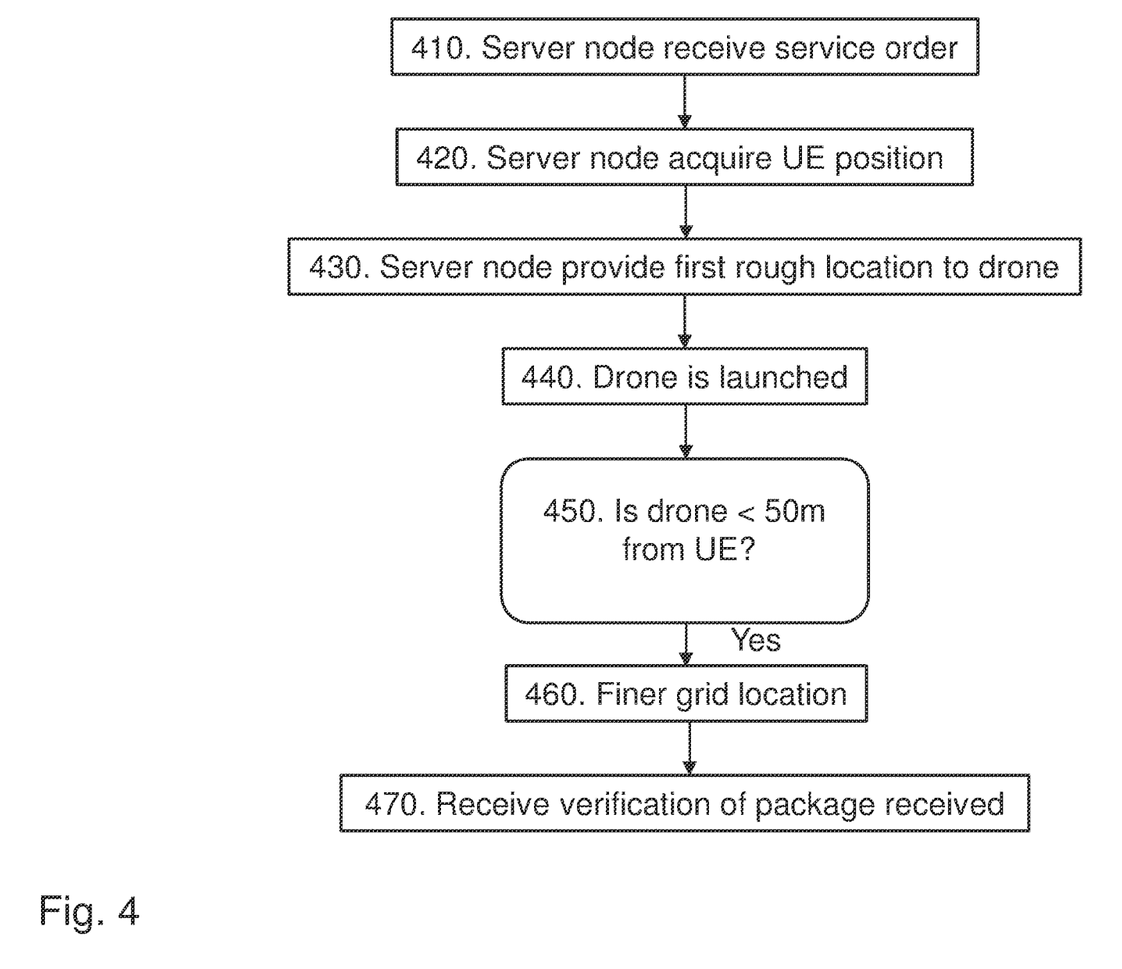
FIG. 4 is a flowchart depicting one example procedure of a user application.

FIG. 4 shows an example procedure 400 of a user application in which network assisted relative positioning according to embodiments herein may be used for assisting a drone to deliver a package to a user where the user is on the move or the destination location is changed. The procedure 400 of this user application may comprise the following steps:

Step 410: a server node receives a service order from a UE, i.e. a user application, a customer, a user etc.

Step 420: The server node acquires the UE position.

Step 430: The server node provides a first rough location to the drone.

Step 440: The drone is launched.

Step 450: The server node may check if the drone is close to the UE, e.g. within 50 m from the UE.

Step 460: If the drone is close to the UE, a positioning technique with a finer grid may be activated.

Step 470: The server node receives a verification that the package has been received by the UE.

From the discussions above on the relative positioning solution with reference to FIG. 2, the relative positioning may be performed in a network node 230 comprised in, e.g. E-SMLC, MME, SLP (SUPL Location Platform) or in a separate node. According to the embodiments herein, a method performed in a network node 230 for relative positioning of a first wireless communication device and a second wireless communication device in a wireless communication network 100, 200, 300 will be described with reference to FIG. 5. The network node 230 may be a separate node or comprised in any one of a E-SMLC, MME 260, or SUPL. The first and second wireless communication devices 210, 220 may be two user equipment wishing to seek and physically find each other. The two user equipment may be either in a drone, a tax, a delivery service car, or simply in a mobile phone, or two users or customers with respective mobile phones. In the following, terms "the first device", "the drone", "the tacking device" are used interchangeably, and "the second device", "the UE", "the tracked device" are used interchangeably. The method comprises the following actions, which actions may be taken in any suitable order:

Action 510

Figure 5:
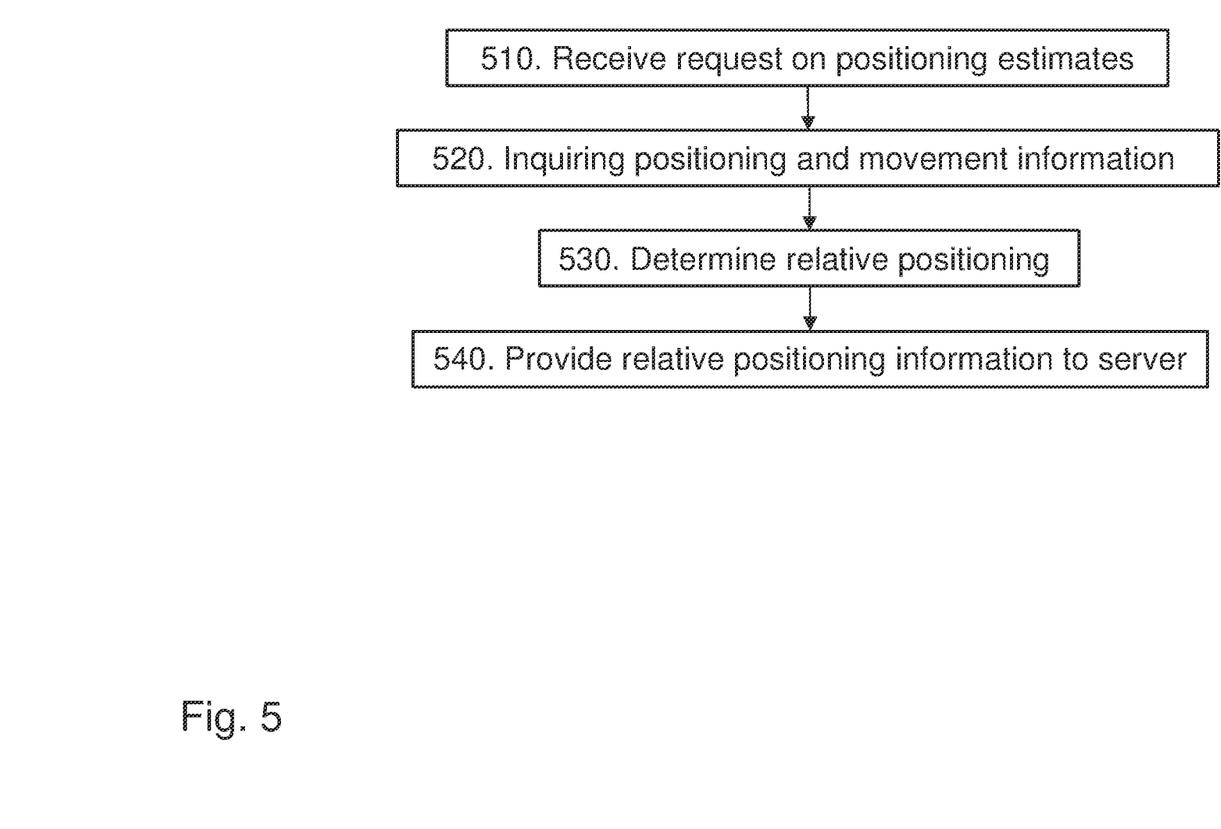
FIG. 5 is a flowchart depicting one embodiment of a method in a network node.

The network node 230 receives a request on positioning estimates of the first and second wireless communication devices 210, 310, 220, 320 from a server, e.g. a Location Based Service, LBS server 240, 340 for the drone 210, 310. For example, the server node 240, 340 receives a service order from a UE, starts a delivery procedure, sends a request to the network node 230 to acquire the UE position and movement information.

Action 520

The network node 230 inquiries positioning and movement information of the first and second devices 210, 310, 220, 320.

According to some embodiments, a frequency of inquiring positioning and movement information of the first and second devices 210, 310, 220, 320 may be dependent on any one of a proximity of the first and second devices 210, 310, 220, 320 or respective speed of the first and second devices 210, 310, 220, 320.

For example, the network node 230 may take into account whether the tracked device i.e. the UE 220, 320 is moving along a path where speed may vary, such as along a road with congestion and/or traffic lights. Particularly, in areas where it is known that UEs display a stop-and-go behavior, the polling of position may be carried out more frequently even though the UE may momentarily be stationary, than if the tracked device is in an area where UEs are stationary or moving only slowly, e.g. a pedestrian street, a park, and the alike.

According to some embodiments, a frequency of inquiring positioning and movement information of the first and second devices may be dependent on whether the second device 220, 320 is at a junction with respect to its common paths. For example, the UE 220, 320 is polled for position more frequently when it is at a junction with respect to its common paths. By polling more often the network node 230 will get feedback earlier on which path the UE 220, 320 is choosing at the junction.

Action 530

The network node 240, 340 determines a relative positioning between the first and second wireless communication devices 210, 310, 220, 320.

The relative positioning may comprise any one of or a combination of a proximity indication, predicted paths or movement pattern(s) of the second device 220, 320, a probability of the second device 220, 320 taking each of the predicted paths, an updated location or heading of the second device 220, 320.

Figure 6A:
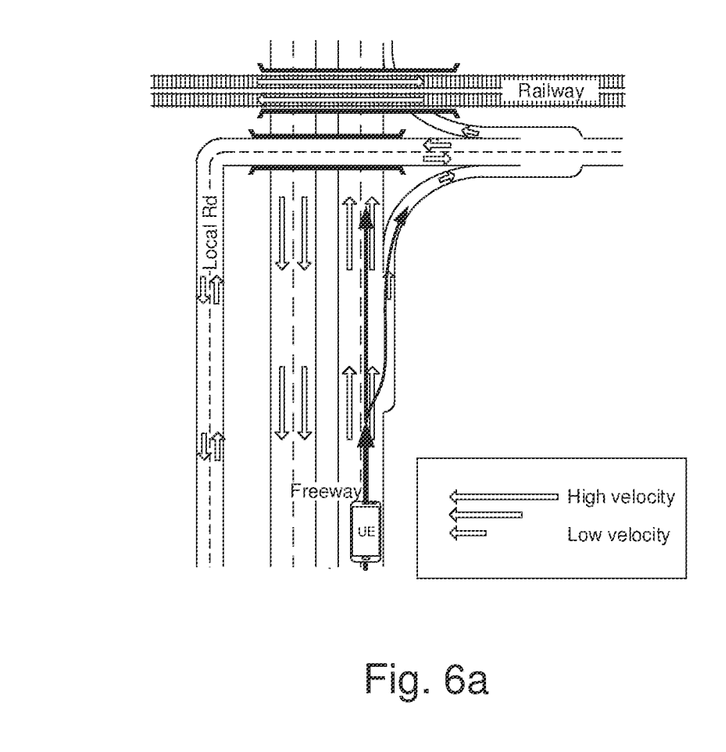
FIG. 6a, 6b are exemplary illustrations on statistical UE paths.
Figure 6B:
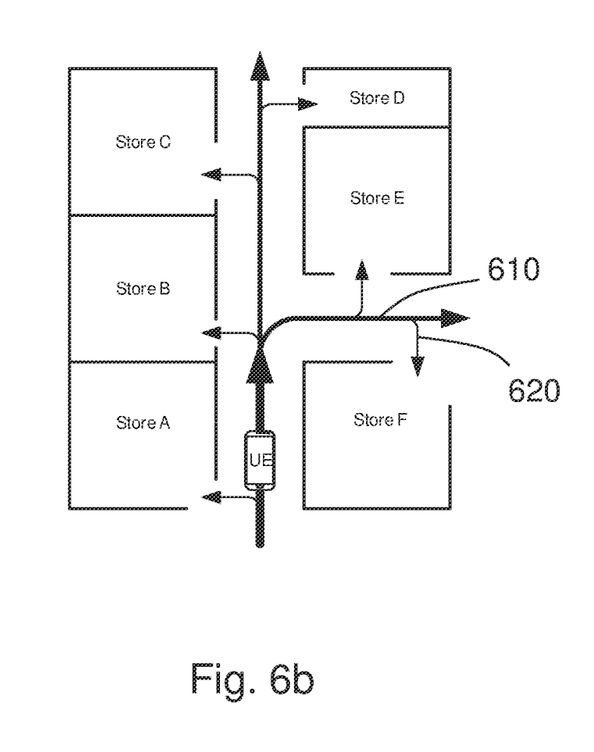

The prediction of path(s) or movement pattern(s) of the second device 220, 320 may be based on statistics of UE trails which is known to the Radio Access Network (RAN) and Core Network (CN) but not disclosed in full to the external LBS client, i.e. the LBS server for the drone. The movement pattern of the UE being tracked is correlated against the statistically determined UE trails to find the most likely options. The underlying principle is that there are physical barriers that restrict the movement of the UEs to certain paths, e.g. traveling along roads etc. FIGS. 6a and 6b are exemplary illustrations on statistical UE paths shown by arrow lines, wherein FIG. 6a shows UE paths set by infrastructure and FIG. 6b shows UE paths set by floor plan. Further, in FIG. 6a, 6b, the thickness of the arrow line is proportional to the probability for UE taking the indicated path, given its current position, speed and heading. For example path 610 has a higher probability than path 620 for the UE to take.

Therefore according to some embodiments, the predicted paths or movement pattern(s) of the second wireless communication device 220, 320 may be determined based on statistic trails of the second wireless communication device 220, 330.

Further, the relative positioning may be determined by taking into account constraints and restrictions regarding movements of any one of the first and second devices. For example, topography and airspace restrictions applicable to the drone 210, 310, e.g. no fly zones etc. may be taken into account when determining the relative positioning.

Action 540 network node 230 provides information on the relative positioning between the first and second wireless communication devices to the LBS server 240, 340.

From the discussions above on the relative positioning solution with reference to FIG. 3, the relative positioning may be handled outside the core network by a third party internet server. According to the embodiments herein, a method performed in a server node, e.g. a LBS server, for assisting a first wireless communication device and a second wireless communication device to seek each other in a wireless communication network will be described with reference to FIG. 7. The first and second wireless communication devices may be two user equipment wishing to seek and physically find each other, and the two user equipment may be either in a drone, a tax, a delivery car service, or simply in a mobile phone, or two users or customers with respective mobile phones. The method comprises the following actions, which actions may be taken in any suitable order:

Action 710

Figure 7:
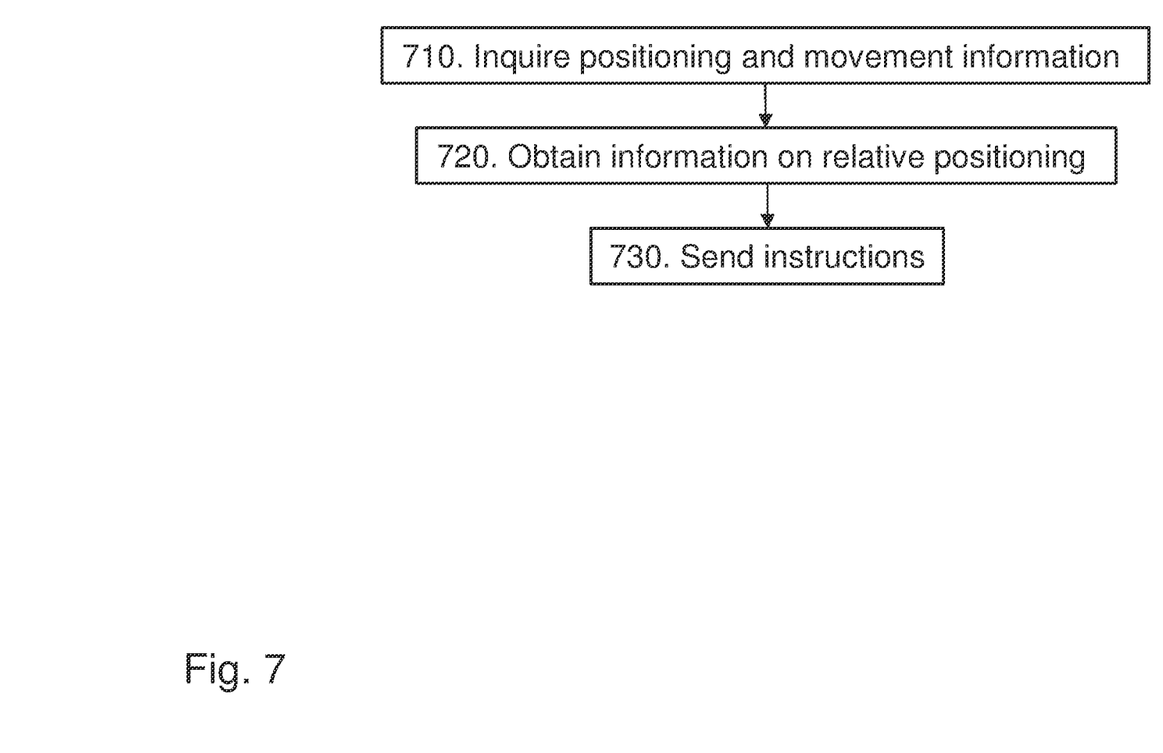
FIG. 7 is a flowchart depicting one example of a method in a server node.

The server node 240, 340 receives a service order from a user, e.g. an order sent by the UE 220, 320. During the delivery procedure, the server node 240, 340 needs to know the position of the UE 220, 320 and the drone 210, 310 and movement information of the UE 220, 320 in order to control or guide the drone 210, 310 to find the UE 220, 320. So the server node 240, 340 inquires positioning and movement information for the first and second devices 210, 310, 220, 320 by sending a request to acquire positioning estimates to a network node or positioning node 230.

A frequency of sending the request to acquire positioning estimates for the first and second devices 210, 310, 220, 320 is dependent on any one of a proximity of the first and second devices or respective speed of the first and second devices. For example, if the first and second devices are separated by a large geographic distance with respect to how fast any of the devices is moving, it may make less sense to update the location information frequently than when the devices are closer to each other. So if the first and second devices are closer to each other, or if any one of the first and second devices is moving quickly, the server node 240, 340 may send the positioning estimate request more often.

Action 720

The server node 240, 340 obtains information on a relative position between the first and the second wireless communication devices 210, 310, 220, 320.

The information on relative position may comprise any one of or a combination of a proximity indication, predicted paths or movement pattern(s) of the second device, a probability of the second device taking each of predicted paths, an updated location or heading of the second device 220, 320 etc.

According to some embodiments, the server node 240, 340 may obtain information on a relative position by receiving the information on the relative position from a positioning node 230 or a third party internet server.

According to some embodiments, the server node 240, 340, i.e. the third party internet server or the LBS server for the drone 210, 310, may determine the relative position between the first and the second wireless communication devices 210, 310, 220, 320. In this case, all discussions and examples described in Action 530 for the network node 230 on determining the relative positioning and predicted paths or movement pattern(s) may be applied for the server node 240, 340. That is, the predicted paths or movement pattern(s) of the second wireless communication device 220, 320 may be determined based on statistic trails of the second wireless communication device 220, 320, and the relative positioning may be determined by taking into account constraints and restrictions regarding movements of any of one the first and second devices 210, 310, 220, 320.

Action 730

The server node 240, 340 sends instructions to at least one of the first and second devices 210, 310, 220, 320 based on the information on the relative position.

According to some embodiments, the server node 240, 340 may send to the first device 210, 310 predicted movement pattern(s) of the second device 220, 320. In this case, the server node 240, 340 may correlate the second device, i.e. the UE 220, 320, movement against map information to allow prediction on where the UE 220, 320 is heading.

According to some embodiments, the server node 240, 340 may send to the first device 210, 310 an updated target location or heading for interception a path of the second device 220, 320 over e.g. the user plane. The updated target location or heading may be determined based on any one or a combination of predicted movement patterns of the second device 320, topography and airspace restrictions applicable to the drone 210, 310, e.g. no fly zones etc. That is when directing the drone 210, 310, the server node 240, 340 may take into account the predicted movement pattern of the UE 220, 320, topography and airspace restrictions applicable to the drone 210, 310 when determining the optimum heading.

The server node 240, 340 may additionally negotiate or provide options to the second device 220, 320, i.e. the tracked UE 220, 320 or the recipient on whether to agree on a delivery point along the course of the UE 220, 320, a suitable delivery point nearby, or to get the delivery while on the move. Therefore according to some embodiments, the server node 240, 340 may provide options to the second device 220, 320 on any one of a delivery point along the path of the second device 220, 320, a delivery point nearby the second device 220, 320 or getting delivery while mobile or while away from registered intended delivery end point location.

According to some embodiments, the server node 240, 340 may send to the second device 220, 320 a target location or heading for interception a path of the first device 210, 310. In this way, the second device 220, 320 may be directed to find the first device 210, 310. For example, for an application (APP) based taxi services, such as Uber, the passenger, i.e., the second device 220, 320 or the UE 220, 320 may be signaled to move to a more accessible location, such as across the street, since the nearest available taxi car is coming from opposite traffic direction. This may be an easier solution than changing direction of the taxi and in some cases it may be not possible to do it.

According to some embodiments, the server node 240, 340 may send to both the first and second devices 210, 310, 220, 320 a target location for directing the first and second devices toward a mutual interception simultaneously. For example, if it is difficult to find an optimum location where both the first and second devices can access, both the first and second devices may be directed to move simultaneously to a new target location.

According to some embodiments, the server node 240, 340 may send to the first and second devices a proximity indication.

For example, when the server node 240, 340 detects that the drone 210, 310 and the UE 220, 320 is in the proximity of each other, e.g. within 50 m, it may trigger the first and second devices to activate other means for locating each other, e.g. Over The Top OTT-based composite positioning methods.

Therefore, according to some embodiments, the server node 240, 340 may send to the first and second devices 210, 310, 220, 320 a proximity indication when a granularity of the relative positioning is lower than a threshold, e.g. less than 50 m.

The server node 240, 340 may trigger the first and second devices 210, 310, 220, 320 to activate any one of a Bluetooth-based, a side-link-based, or a WiFi-based technique, or any other hybrid or composite location methods for pinpointing the first and second devices 210, 310, 220, 320 to reach each other.

If the server node 240, 340 fails to find an interception point, e.g. due to the UE 220, 320 moving at too high speed, it may abort or postpone the delivery until the UE 220, 320 is stationary or moving at a lower speed, or until a delivery point has been agreed.

To summarize above discussions, advantages of the embodiments herein for relative positioning of the first and second devices includes:

It provides an improved network-assisted positioning of wireless communication devices for assisting them to find each other by obtaining the relative positioning information and providing up to date and dynamic instruction and information to both UEs so that they can find and meet each other.

The relative positioning and dynamic instruction may be determined by directly or indirectly taking into account constraints and restrictions regarding movement of any of the first and second devices, e.g. physical barriers for UEs on the ground, and restricted flight paths for an airborne drone, e.g. restricted airspace at airports, and future regulated airways for drones, etc.

The embodiments herein may utilize some existing positioning systems available today. Although some solutions may already exist today with a GPS to direct drones to a previously programmed location, for situations when there is no GPS signal available or a cost sensitive IoT device without GPS capability, it can still use relative positioning functionality. Additionally, when the devices are within a certain distance, e.g. 50 m, the proposed solution may utilize over the top OTT composite positioning methods for bringing the two devices together e.g. Wifi, Bluetooth, and Side link-based solutions. So the embodiments herein provide an additional granularity e.g. within 50 m of target location.

The embodiments herein also allow for the UE or the drone to change final destination location and therefore it is not restricted to the end location initially programmed to the drone.

The embodiments herein provide in general an ability of driving two automatous devices to reach each other. One direct application would be a "find child" or "find person" application in which, one party within a dwelling such as mall, office building or etc. needs to be located and without the use of a GPS signal. In addition, for some instances, when the GPS granularity is not fine enough, such as in both parties are in the same building, the embodiments herein provide an essential ability to bring both parties together.

With the progression in APP based taxi services such as Uber, taxi cars may also use the embodiments herein as a means to better locate their newest passenger.

Moreover, with the increasing interest in autonomous vehicles, e.g. self-driving car projects, the embodiments herein may be potentially critical to applications involving pickup or delivery by autonomous vehicles.

Figure 8:
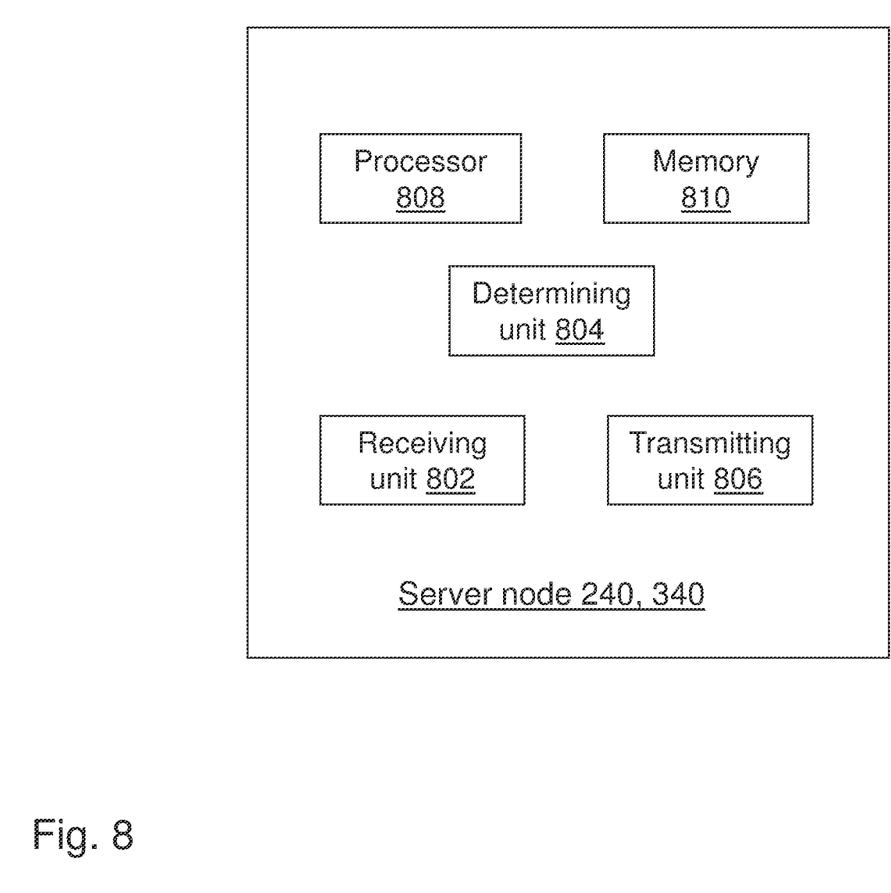
FIG. 8 is a schematic block diagram illustrating embodiments of a server node.

To perform the method actions in the server node 240, 340, e.g. the LBS server 240, 340 or a third party internet server, for assisting a first wireless communication device 210, 310 and a second wireless communication device 220, 320 to seek each other in the wireless communication network 100 described above in relation to FIG. 7, the server node 240, 340 comprises circuits or units as depicted in FIG. 8. The server node 240, 340 comprises e.g. a receiving unit 802, a determining unit 804, a transmitting unit 806, a processor 808 and a memory 810.

The server node 240, 340 is configured to, e.g. by means of the transmitting unit 806 being configured to, inquire positioning and movement information of the first and second devices 210, 310, 220, 320 by sending a request to a network node.

The server node 240, 340 is further configured to, e.g. by means of the determining unit 804 being the configured to, obtain information on a relative position between the first and the second devices.

There are several ways to obtain the information on the relative position between the first and the second devices 210, 310, 220, 320:

According to one embodiment, the server node 240, 340 may be configured to, e.g. by means of the receiving unit 802 being configured to, receive the information on relative position from a positioning node or a third party internet server.

According to one embodiment, the server node 240, 340 may be configured to, e.g. by means of the determining unit 804 being configured to, determine the relative position between the first and the second devices 210, 310, 220, 320.

The server node 240, 340 is further configured to, e.g. by means of the transmitting unit 806 being configured to, send instructions to at least one of the first and second devices 210, 310, 220, 320 based on the information on the relative position.

There are several ways to send instructions to at least one of the first and second devices 210, 310, 220, 320:

According to one embodiment, the server node 240, 340 may be configured to send to the first device 210, 310 predicted movement pattern(s) of the second device 220, 320.

According to one embodiment, the server node 240, 340 may be configured to send to the first device 210, 310 an updated target location or heading for interception a path of the second device.

According to one embodiment, the server node 240, 340 may be configured to provide options to the second device 220, 320 on any one of a delivery point along the path of the second device, a delivery point nearby the second device or getting delivery while mobile or while away from registered intended delivery end point location.

According to one embodiment, the server node 240, 340 may be configured to send to the second device 220, 320 a target location or heading for interception a path of the first device 210, 310.

According to one embodiment, the server node 240, 340 may be configured to send to both the first and second devices a target location for directing the first and second devices toward a mutual interception simultaneously.

According to one embodiment, the server node 240, 340 may be configured to send to the first and second devices 210, 310, 220, 320 a proximity indication when a granularity of the relative positioning is lower than a threshold.

According to one embodiment, the server node 240, 340 may be configured to trigger the first and second devices to activate any one of a Bluetooth-based, a side-link-based, a WiFi-based technique, or any other hybrid or composite location methods for pinpointing the first and second devices to reach each other.

Figure 9:
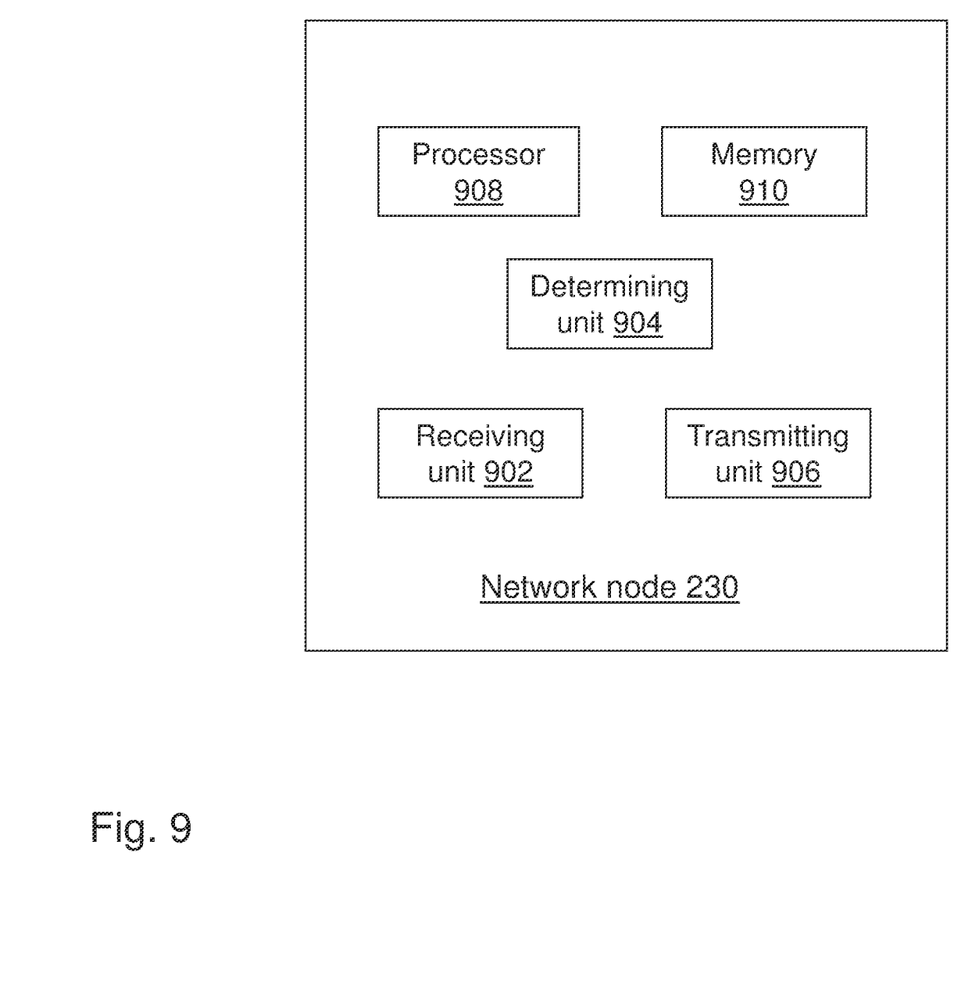
FIG. 9 is a schematic block diagram illustrating embodiments of a network node.

To perform the method actions in a network node 230 for relative positioning of a first wireless communication device 210, 310 and a second wireless communication device 220, 320 in a wireless communication network 100, 200, 300, described above in relation to FIG. 5, the network node 230 may comprise circuits or units as depicted in FIG. 9. The network node 230 comprises e.g. a receiving unit 902, a determining unit 904, a transmitting unit 906, a processor 908 and a memory 910.

According to the embodiments herein, the network node 230 is configured to, e.g. by means of the receiving unit 902 being configured to, receive a request on positioning estimates of the first and second wireless communication devices from a server 240, 340.

The network node 230 is further configured to, e.g. by means of the transmitting unit 906 being configured to, inquire positioning and movement information of the first and second devices 210, 310, 220, 320.

The network node 230 is further configured to, e.g. by means of the determining unit 904 being configured to, determine a relative positioning between the first and second wireless communication devices 210, 310, 220, 320.

The network node 230 is further configured to, e.g. by means of the transmitting unit 906 being configured to, provide information on the relative positioning between the first and second wireless communication devices to the server 240, 340.

According to some embodiments herein, the network node 230 may be comprised in any one of an Evolved Serving Mobile Location Centre, E-SMLC, a Mobility Management Entity, MME, a Secure User Plane Location, SUPL.

According to some embodiments herein, a frequency to inquire positioning and movement information of the first and second devices may be dependent on any one of a proximity of the first and second devices, respective speed of the first and second devices, or whether the second device 220, 320 is at a junction with respect to its common paths.

According to some embodiments herein, the relative positioning may be determined by taking into account constraints and restrictions regarding movements of any of one the first and second devices.

According to some embodiments herein, the relative positioning may comprise any one of or a combination of a proximity indication, predicted paths or movement pattern(s) of the second device, a probability of the second device taking each of predicted paths, an updated location or heading of the second device.

According to some embodiments herein, the predicted paths or movement pattern(s) of the second wireless communication device 220, 320 may be determined based on statistic trails of the second wireless communication device.

According to some embodiments herein, the network node 230 may be further configured to correlate the movement of the second device 220, 320 against map information to determine predicted paths of the second device 220, 320.

According to some embodiments herein, the first and second wireless communication devices may be two user equipment wishing to seek and physically find each other. The two user equipment may be either in a drone, a tax, a delivery car service, or in a mobile phone.

Those skilled in the art will appreciate that the receiving unit 802, the determining unit 804 and the transmitting unit 806 described above in the server node 240, 340 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC). These may also apply to the receiving unit 902, the transmitting unit 906 and the determining unit 904 described above in the network node 230.

The embodiments herein for relative positioning and assisting a first wireless communication device 210, 310 and a second wireless communication device 220, 320 to seek each other in the wireless communication network 100, may be implemented through one or more processors, such as the processor 808 in the server node 240, 340, the processor 908 in the network node 230, together with computer program code for performing the functions and actions of the embodiments herein. The program code mentioned above may also be provided as a computer program product, for instance in the form of a data carrier carrying computer program code for performing the embodiments herein when being loaded into the server node 240, 340, the network node 230. One such carrier may be in the form of a CD ROM disc. It is however feasible with other data carriers such as a memory stick. The computer program code may furthermore be provided as pure program code on the cloud and downloaded to the server node 240, 340, the network node 230.

The memory 810 in the server node 240, 340 and the memory 910 in the network node 230 may comprise one or more memory units and may be arranged to be used to store received information, positioning information, data, configurations and applications to perform the methods herein when being executed in the server node 240, 340 and the network node 230.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

What is claimed is:

1. A method performed in a server node for assisting a first wireless communication device and a second wireless communication device to seek each other in a wireless communication network, comprising:
   repeatedly inquiring positioning and movement information of the first and second wireless communication devices;
   obtaining information on a relative position between the first and the second wireless communication devices; and
   sending instructions to at least one of the first and second wireless communication devices based on the information on the relative position;
   wherein a frequency of the repeatedly inquiring positioning and movement information of the first and second wireless communication devices is dependent on whether the second wireless communication device is at a junction of paths commonly taken by the second wireless communication device.

2. The method of claim 1, wherein obtaining the information on the relative position between the first and the second wireless communication devices comprises determining the relative position in the server node.

3. The method of claim 1, wherein obtaining the information on the relative position between the first and the second wireless communication devices comprises receiving the information on the relative position from a positioning node or a third-party internet server.

4. The method of claim 1, wherein sending instructions to at least one of the first and second wireless communication devices comprises sending, to the first wireless communication device, predicted movement pattern(s) of the second wireless communication device.

5. The method of claim 1, wherein sending instructions to at least one of the first and second wireless communication devices comprises sending, to the first wireless communication device, an updated target location or heading for intercepting a path of the second wireless communication device.

6. The method of claim 5, wherein the updated target location or heading is determined based on any one of or a combination of predicted movement patterns of the second wireless communication device, topography and airspace restrictions applicable to the first wireless communication device.

7. The method of claim 1, wherein sending instructions to at least one of the first and second wireless communication devices comprises providing options to the second wireless communication device on any one of:
- a delivery point along the path of the second wireless communication device; and
- getting delivery while mobile or while away from registered intended delivery end point location.

8. The method of claim 1, wherein sending instructions to at least one of the first and second wireless communication devices comprises sending, to the first and second wireless communication devices, a proximity indication.

9. A method performed in a network node for relative positioning of a first wireless communication device and a second wireless communication device in a wireless communication network, the method comprising:
- receiving a request on positioning estimates of the first and second wireless communication devices from a server;
- repeatedly inquiring positioning and movement information of the first and second wireless communication devices;
- determining a relative positioning between the first and second wireless communication devices;
- providing information on the relative positioning between the first and second wireless communication devices to the server;

wherein a frequency of the repeatedly inquiring positioning and movement information of the first and second wireless communication devices is dependent on whether the second wireless communication device is at a junction of paths commonly taken by the second wireless communication device.

10. The method of claim 9, wherein the relative positioning is determined by taking into account constraints and restrictions regarding movements of any one of the first and second wireless communication devices.

11. The method of claim 9, wherein the relative positioning comprises any one of or a combination of a proximity indication, predicted paths or movement pattern(s) of the second wireless communication device, a probability of the second wireless communication device taking each of predicted paths, an updated location or heading of the second wireless communication device.

12. The method of claim 11, wherein the predicted paths or movement pattern(s) of the second wireless communication device is determined based on statistic trails of the second wireless communication device.

13. The method of claim 9, further comprising correlating the movement of the second wireless communication device against map information to determine predicted paths of the second wireless communication device.

14. A server node for assisting a first wireless communication device and a second wireless communication device to seek each other in a wireless communication network, the server node is configured to:
- repeatedly inquire positioning and movement information of the first and second wireless communication devices;
- obtain information on a relative position between the first and the second wireless communication devices; and
- send instructions to at least one of the first and second wireless communication devices based on the information on the relative position;

wherein a frequency of the repeatedly inquiring positioning and movement information of the first and second wireless communication devices is dependent on whether the second wireless communication device is at a junction of paths commonly taken by the second wireless communication device.

15. The server node of claim 14, wherein the information on the relative position comprises any one of or a combination of a proximity indication, predicted paths or movement pattern(s) of the second wireless communication device, a probability of the second wireless communication device taking each of predicted paths, an updated location or heading of the second wireless communication device.

16. The server node of claim 14, wherein the server node is configured to obtain the information on the relative position between the first and the second wireless communication devices by being configured to:
- receive the information on the relative position from a positioning node or a third party internet server.

17. The server node of claim 14, wherein the server node is configured to:
- send, to the first wireless communication device, predicted movement pattern(s) of the second wireless communication device.

18. The server node of claim 14, wherein the server node is configured to:
- send to the first wireless communication device an updated target location or heading for interception of a path of the second wireless communication device.

19. The server node of claim 14, wherein the server node is configured to:
- provide options to the second wireless communication device on any one of a delivery point along the path of the second wireless communication device, and getting delivery while mobile or while away from registered intended delivery end point location.

20. The server node of claim 14, wherein the server node is configured to:
- send, to the first and second wireless communication devices, a proximity indication when a granularity of the relative positioning is lower than a threshold.

* * * * *